Jan. 3, 1956
E. O. YOUNG
2,729,114
DAMPER REGULATOR
Filed July 27, 1954
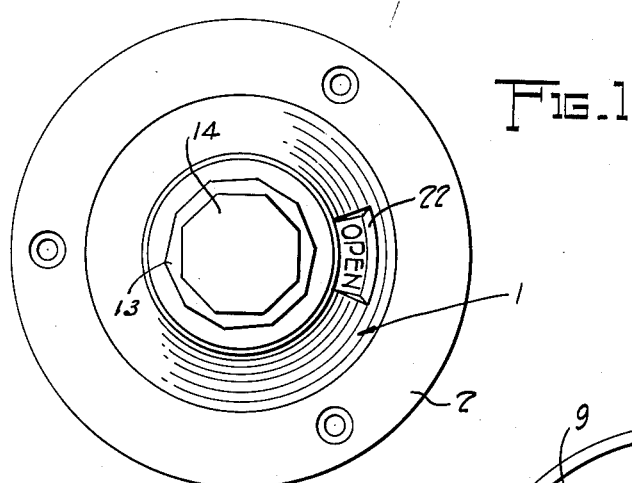
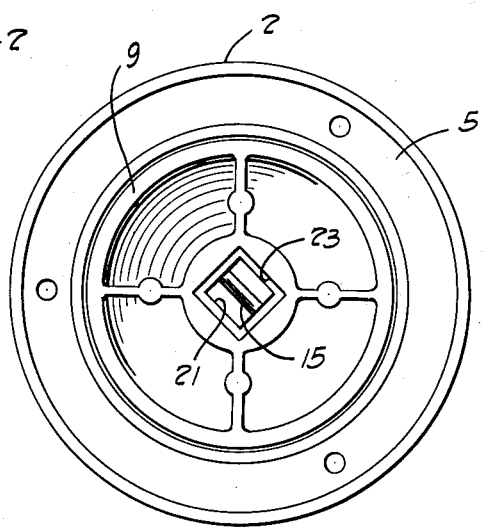
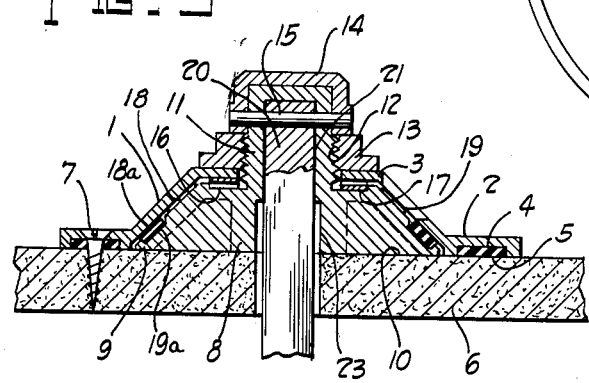
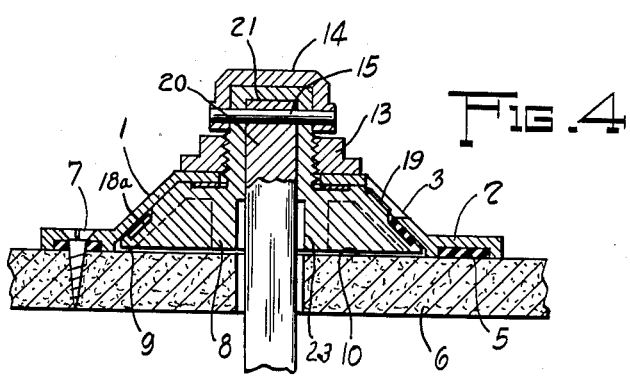
INVENTOR.
EMIL O. YOUNG
BY
Robb & Robb
attorneys

United States Patent Office 2,729,114
Patented Jan. 3, 1956

2,729,114

DAMPER REGULATOR

Emil O. Young, Cleveland Heights, Ohio

Application July 27, 1954, Serial No. 446,090

2 Claims. (Cl. 74—504)

This invention relates to damper regulators and more particularly to means for controlling the position of a damper or the like in a conduit with substantial accuracy after an initial setting of the same has been effected.

In controlling devices availed of for damper regulation, it is desirable to provide means external of a conduit whereby the damper therewithin may be controlled with great accuracy when desired, and once an initial setting of the damper has been established to thereafter cause the same to be locked in position without disturbing such setting. The device hereof facilitates such control and enables the positioning of a damper within a conduit with very great accuracy, the control means enabling adjustment to any position and locking in that position thereafter.

In general the control means of the device include an escutcheon member mounted on the side of a conduit, the member enclosing therewithin a suitable plug-like part, the plug-like part being maintained in frictional contact with the surface of the conduit preliminarily so as to support the damper in its adjusted position and thereafter to enable manipulation of the locking means to maintain the damper in the adjusted position.

The escutcheon member is provided with suitable bearing means whereby the plug therewithin is guided, and in addition suitable resilient means are provided to cause the plug to frictionally engage the surface of the conduit adjacent thereto, until an initial locking movement of an external lock nut is undertaken, the lock position thereafter being positively effected by additional interengaging parts on the plug and escutcheon.

It is therefore a principal object of this invention to provide a simple arrangement of parts in a damper regulator whereby accurate control of the positioning of the damper is possible, the same availing of frictional engagement of one of the parts in its originally located position; and to maintain such part in that position until a positive locking of the respective parts is effected.

Other and further objects of the invention will be understood from a consideration of the specification appended hereto and shown in the drawing wherein:

Figure 1 is a top plan view of the control means of the invention showing the general outline of parts thereof.

Figure 2 is a bottom plan view of the control means.

Figure 3 is a transverse sectional view showing the control means as mounted on a conduit with the rotatable plug therewithin in contact with the conduit wall.

Figure 4 shows the respective parts in their fully locked position, the view being similar to Figure 3.

Referring now to the drawing, in Figure 1 the control means is shown as comprising a conically shaped escutcheon 1, having at its outer extremity a skirt 2, and at its inner portion a shoulder or bearing section 3 more clearly shown in Figure 3.

The skirt 2 is shown in Figure 3 as being provided with a gasket receiving channel designated 4, and seated therewithin is the gasket 5 of rubber or similar resilient material.

The unit as a whole is shown in Figure 3 and Figure 4 as being mounted on the wall of a conduit designated 6, as by means of the metal screws or the like indicated at 7.

It should be understood that the skirt 2 is caused to compress the gasket 5 when assembled by means of the screws 7 on the wall of the conduit 6 and in this position the plug generally designated 8 within the escutcheon 1 engages at its periphery 9 with the outer surface designated 10 of the conduit 6. The plug 8 is of conical shape similar to the escutcheon 1 so as to relatively closely conform thereto and is provided with a shaft section 11 extending through the bearing portion 3 of the escutcheon. The shaft portion 11 is equipped with threads at its outer surface indicated at 12, and adapted to receive thereon a suitable lock nut 13 for cooperation with the threads 12 as will be understood.

At the outer end of the shaft 11 of the plug 8, the same is equipped with a cap 14, the cap being of nut-like shape and fitting over the end of the shaft, a suitable pin 15 engaging both the shaft and the cap 14.

Intermediate the bearing portion 3 of the escutcheon 1, and the upper surface 16 of the plug 8, is a suitable washer of spring material indicated at 17, whereby the tension on the washer 17 results in maintaining periphery 9 of the plug 8 in contact with the surface 10 under the condition of the parts indicated in Figure 3 which is designated as being unlocked.

Formed in the interior of the escutcheon and extending slightly from the surface of the wall thereof is a series of serrations or a knurled portion designated 18, which will mate with a similarly formed knurled or serrated portion 19 formed on the exterior surface of the plug 8. As shown in Figure 3, these serrations of the respective parts are not engaged by reason of the fact that the spring 17 is exerting force between the shoulder 3 and the upper surface of the plug.

Adjacent the serrations 19 on the plug 8, is a groove 19a in which is seated a conically shaped gasket 18a, which in the position of the parts in Figure 3, is in its expanded condition, with very little or no contact being exerted against the opposed surface of the escutcheon.

The arrangement of the parts heretofore described is such that the damper may be set as necessary by means of a shaft such as 20 which includes a square section thereon to enter the corresponding opening 21 in the shaft 11, the damper being supported on such shaft, whereby rotation of the damper may be effected. When the damper has been moved by means of a suitable wrench being applied to the cap 14, the same will be maintained in that position by reason of the frictional engagement of the periphery 9 of the plug 8, the gasket 18a likewise providing resistance to rotation to some extent. Thereafter when it is desired to effect a locking of the damper in such position, the nut 13 is manipulated by a suitable wrench, which causes the plug 8 to move into closer association with the interior of the escutcheon 1 and thereby the respective serrations 18 and 19 are caused to interengage. During such movement or prior thereto heretofore, there has been a decided tendency on the part of the damper to move while the locking operation was being performed, and thus the frictional engagement of the periphery 9 with the surface 10 now provides for maintaining the damper in its adjusted position until the serrated parts 18 and 19 are sufficiently close to one another to engage and maintain the damper in its set position.

When the plug has been moved into the position shown in Fig. 4, with the serrations 18 and 19 interengaged, the gasket 18a will be compressed to thereby provide for sealing of the conduit wall 6 and prevent escape of gases through the opening in which the shaft 20 is entered, in conjunction with the gasket 5 previously described.

In the escutcheon 1 a suitable opening as indicated at 22 in the escutcheon may be provided, whereby indicia upon the outer surface of the plug 8 may be observed and the position of the damper ascertained thereby.

In addition, the plug 8 is provided with a further square opening therein as indicated at 23, whereby shafts of different sizes for various sized dampers may be availed of, the opening 23 in the plug providing for one size shaft and the opening 21 in the shaft 11 providing for a smaller size of shaft, as will be understood.

As has been indicated the position of the parts shown in Figure 4 indicates that the damper is in its fully locked position, whereby the plug 8 and escutcheon 1 are closely associated, the spring 17 being compressed and the serrated parts 18 and 19 being in engagement.

There has thus been provided a simple form of damper control for damper regulation whereby extreme accuracy of positioning of the damper is provided.

I claim:

1. In damper control means of the class described, in combination, an escutcheon, a skirt on the extremity thereof having a face for mounting the escutcheon on a conduit, a plug in the escutcheon adapted to contact a portion of a conduit, a bearing section in the escutcheon, a shaft extending from the plug through the escutcheon, locking means on the shaft and resilient means intermediate the plug and escutcheon to effect initial frictional engagement of the plug and adjacent conduit face to thereby maintain the plug in adjusted position during manipulation of the locking means to locking position, the interior of the escutcheon being generally of conical shape, the plug of similar shape and conforming closely to the interior of the said escutcheon, locking elements being provided on the plug and in the escutcheon, said elements providing positive positioning of the plug after the plug has moved out of the frictional engagement specified.

2. A damper control as claimed in claim 1, wherein the plug includes a peripheral portion for initial frictional engagement with a conduit face, the resilient means comprises a spring mounted between the plug and escutcheon, said spring normally biasing the plug away from the escutcheon interior, the shaft of the plug is threaded and a lock nut is mounted thereon for engagement with the escutcheon to thereby maintain said plug in fixed position.

References Cited in the file of this patent
UNITED STATES PATENTS

| | | |
|---|---|---|
| 1,477,785 | Szulkalski, Jr. | Dec. 18, 1923 |
| 2,322,031 | Kuebert | June 15, 1943 |
| 2,517,730 | Sprigg | Aug. 8, 1950 |
| 2,561,482 | Schostak | July 24, 1951 |
| 2,626,529 | Quoss | Jan. 27, 1953 |